United States Patent
Pizot et al.

(10) Patent No.: US 9,276,895 B2
(45) Date of Patent: Mar. 1, 2016

(54) DEVICE SERVICE DISCOVERY

(71) Applicant: Hewlett-Packard Development Company, L.P., Fort Collins, CO (US)

(72) Inventors: Laurent Pizot, Camas, WA (US); Sudhindra Venkatesh Kulkarni, Bangalore Karnataka (IN); Rodney Hofer, Vancouver, WA (US); Rajrajat Naik, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/767,437

(22) Filed: Feb. 14, 2013

(65) Prior Publication Data

US 2014/0226174 A1    Aug. 14, 2014

(51) Int. Cl.
*G06F 3/12*      (2006.01)
*G06K 15/00*    (2006.01)
*H04L 29/12*    (2006.01)
*G06F 15/16*    (2006.01)

(52) U.S. Cl.
CPC .............. *H04L 61/10* (2013.01); *G06F 3/1204* (2013.01); *G06F 3/1226* (2013.01); *G06F 3/1272* (2013.01); *G06F 3/1292* (2013.01)

(58) Field of Classification Search
CPC ..... G06F 3/1204; G06F 3/122; G06F 3/1228; G06F 3/1292; G06F 3/1268; G06F 3/1287; G06F 3/1288; G06F 3/1226; G06F 3/1231; G06F 21/608; H04L 61/1541; H04L 67/16; H04L 61/10
USPC .......... 358/1.1, 1.9, 2.1, 1.11–1.18, 400–404; 709/201–203, 213–219
See application file for complete search history.

(56) References Cited

U.S. PATENT DOCUMENTS

| | | | |
|---|---|---|---|
| 7,412,518 B1 | 8/2008 | Duigou et al. | |
| 2004/0257610 A1* | 12/2004 | Itoh | H04L 29/06 358/1.15 |
| 2004/0263870 A1* | 12/2004 | Itoh | G06F 3/1204 358/1.1 |
| 2005/0138065 A1* | 6/2005 | Ciriza | G06Q 10/10 |
| 2006/0047853 A1* | 3/2006 | Igarashi | H04L 29/12028 709/245 |
| 2007/0150595 A1 | 6/2007 | Bhorania et al. | |
| 2008/0271047 A1 | 10/2008 | Rafnsson | |
| 2011/0235085 A1* | 9/2011 | Jazayeri | G06F 3/1204 358/1.14 |
| 2011/0238981 A1 | 9/2011 | Nanaumi | |
| 2012/0054794 A1* | 3/2012 | Kim | G06F 3/0346 725/38 |

(Continued)

FOREIGN PATENT DOCUMENTS

| IN | WO 2011090474 A1 * | 7/2011 | ............ G06F 3/1204 |
|---|---|---|---|
| WO | WO 2011090474 A1 * | 7/2011 | |

OTHER PUBLICATIONS

Mobile Location Based Services, Ofcom, Retrieved Feb. 13, 2013, http://consumers.ofcom.org.uk/2009/10/a-guide-for-parents-and-carers-on-mobile-location-based-services/.

(Continued)

*Primary Examiner* — Chad Dickerson
(74) *Attorney, Agent, or Firm* — Hewlett-Packard Patent Dept.

(57) ABSTRACT

A service discovery request is received from a printing device at a cloud server. The request includes profile information for the printing device. In response to the request, service information is provided to the printing device. The service information includes location information and an encryption scheme for retrieving a list of services available to the printing device.

16 Claims, 5 Drawing Sheets

(56) References Cited

U.S. PATENT DOCUMENTS

| | | | | |
|---|---|---|---|---|
| 2012/0140285 A1* | 6/2012 | Kamath | ............... | G06F 3/1204 358/1.15 |
| 2012/0215910 A1* | 8/2012 | Wada | .................... | G06F 3/1204 709/224 |
| 2012/0243029 A1* | 9/2012 | St. Jacques, Jr. | ...... | G06F 3/1204 358/1.15 |
| 2012/0246221 A1* | 9/2012 | Miyawaki | ........... | G06F 21/6236 709/203 |

OTHER PUBLICATIONS

Tony Dennis, Guest Post: Can Cloud Powered Location Based Service Solutions Increase Number of Mobile Users?, GoMo New, Published Apr. 3, 2012, http://www.gomonews.com/guest-post-can-cloud-powered-location-based-service-solutions-increase-number-of-mobile-users/.

Cheshire, et al. Internet Engineering Task Force. DNS-Based Service Discovery. Apple, Inc. Dec. 9, 2011.

Hildebrand, et al. XEP-0030: Service Discovery. XMPP Standards Foundation Jun. 6, 2008.

* cited by examiner

DEVICE SERVICE DISCOVERY

BACKGROUND

A web-connected printer enables a user to print content from the web by using a unique e-mail assigned to the user's printer. For example, a web-connected printer may connect to the web through one-touch print apps to access printable maps, movies, tickets, coupons, news, and so on. Further, web-connected printers such as an all-in-ones (AIOs) (or e-AIOs) enable users to print, copy, scan, or fax documents received from an external source (e.g., a smartphone).

BRIEF DESCRIPTION OF THE DRAWINGS

The following detailed description references the drawings, wherein.

DETAILED DESCRIPTION

Figure 1:
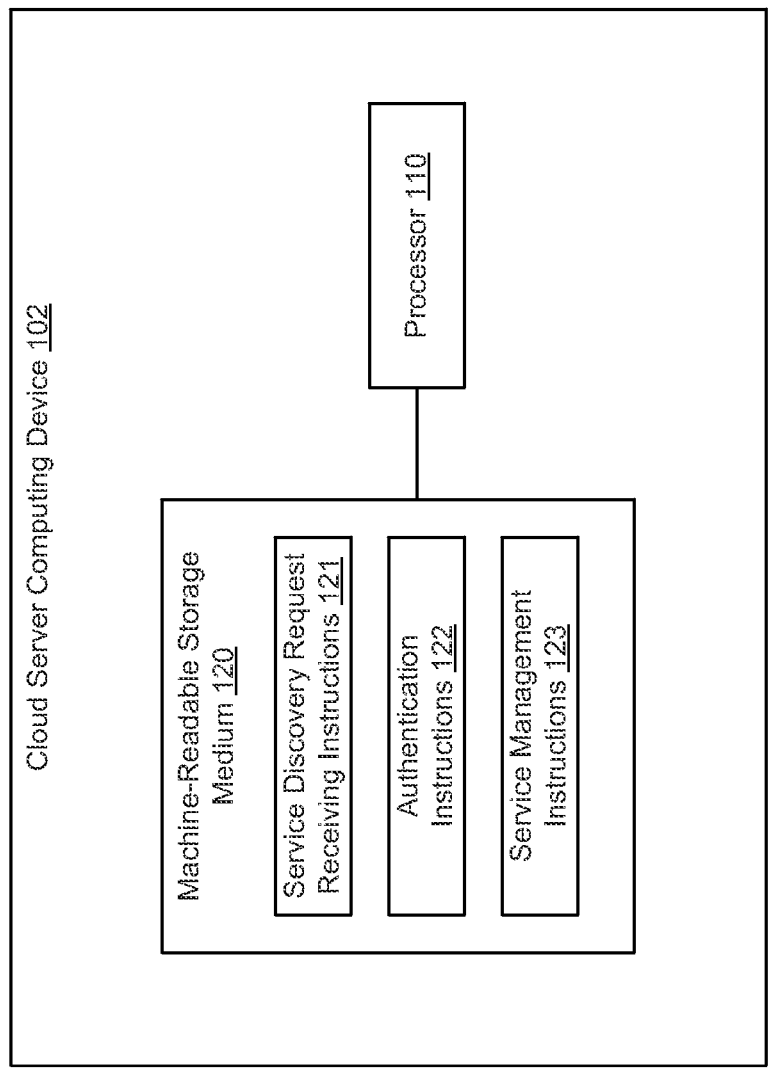
FIG. 1 is a block diagram of a cloud server computing device, according to one example.

Various aspects of the present disclosure are directed to device service discovery. More precisely, various aspects of the present disclosure are directed to providing a web-connected printing device with a list of services available to the printing device and corresponding location of the services, in a secure manner. For example, the list of services available to the printing device may be dependent on the capabilities of the printing device and availability of the service in the cloud server.

Web-connected printers such as Hewlett-Packard Company's ePrint-enabled printers are provided with a wide range of services from the ePrint cloud infrastructure. For example, a service provided by the ePrint includes email printing service, where an email address is assigned to a user's printing device. To print, the user simply sends an email containing the desired document to the printing device's address. Other ePrint services include downloadable print apps that allow users to print content with a few clicks, and scan based services (e.g., scan2email). Accordingly, web-connected printers are capable of accepting printable materials from virtually anywhere, in any format, and producing high-quality printed documents.

Discovery service provides an interface for web-connected printing devices to find the various services provided by the cloud infrastructure. A current solution for service discovery is to hard code the service location into a firmware of the printing device. However, having service names and locations hard coded into the printing device limits the flexibility of the cloud infrastructure to update (e.g., add new services) or relocate cloud services.

Accordingly, examples disclosed herein provide a solution for enabling device service discovery in a secure manner. The described solution routes web-connected printing devices to a service location based on various options like region of the printing device, load on the server, and other parameters. Further, the solution provides flexibility to the cloud infrastructure to relocate services with no disruption to the web-connected printing devices. In addition, legacy devices that have location information permanently embedded in firmware may be provided with new services.

In one example, a cloud server computing device for enabling device service discovery includes a processor to receive a service discovery request from a printing device, where the request includes profile information associated with the printing device. The processor is further to authenticate the printing device based on the profile information and to provide the printing device with service information based on the authentication and the profile information. The service information includes location information and an encryption scheme for retrieving a list of services available to the printing device.

In another example, a method of enabling device service discovery includes receiving, by a cloud server computing device, a service discovery request from a printing device, where the request includes profile information for the printing device. The method includes authenticating the printing device using the profile information. The method also includes providing the printing device with service information based on the profile information, where the service information includes location information and an encryption scheme for retrieving a list of services available to the printing device.

In another example, a non-transitory computer-readable medium may include instructions that, when executed by a processor in a printing device, cause the printing device to send a service discovery request to a cloud server computing device, where the request includes profile information for the printing device. The instructions are executable to receive service information from the cloud server computing device, where the service information includes location information and an encryption scheme for retrieving a list of services available to the printing device. The instructions are also executable to retrieve the list of services using the location information and the encryption scheme.

FIG. 1 depicts a block diagram of a cloud server computing device, according to one example. Cloud server computing device 102 is a cloud infrastructure for providing cloud services to web-connected client printing devices such as printing device 202 of FIG. 2. For example, cloud server 102 may provide printing devices with services such as email printing services, printing apps usable for printing content from the Internet with a few clicks, scan based services (e.g., scan2email service), and cloud registration and management services. Moreover, cloud server 102 may provide printing devices with print jobs, scan jobs, and facsimile jobs. Accordingly, cloud server 102 may be any computing device accessible to a plurality of printing devices over the Internet. In the example of FIG. 1, cloud server 102 includes a processor 110 and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 121, 122, and 123 to enable service discovery for one or more printing devices, as described below. As an alternative, or in addition to retrieving and executing instructions, processor 110 may include one or more electronic circuits comprising a number of electronic components for performing the functionality of one or more instructions 121, 122, and 123.

Machine-readable storage medium 120 may be an electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for enabling service discovery.

Service discovery request receiving instructions 121 may receive a service discovery request from a printing device. The service discovery request may include profile information associated with the printing device sending the request. In some examples, the request may be received from the printing device via a secure communication protocol such a hypertext transfer protocol secure (HTTPS).

Authentication instructions 122 may then authenticate the printing device based on the profile information included in the request. In certain examples, the profile information includes device identification (device ID) or any other type of device credentials for identifying the printing device at the cloud server 102. For example, the profile information may be usable to identify the printing device as a cloud-registered printing device. The device ID/credentials may be provided to the printing device when the printing device is registered with the cloud server 102. Accordingly, the printing device is authenticated based at least in part on the device ID/credentials.

Service management instructions 123 may provide the printing device with service information upon successful authentication of the printing device. In certain examples, the service information provided to the printing device includes location information and an encryption scheme for retrieving a list of services available to the printing device. The location information may include a uniform resource locator (URL) or any other Internet resource/address for retrieving the list of services available to the printing devices. For example, the list of services may be cached at a content delivery network (CDN), such as CDN 380 of FIG. 3. In certain examples, the encryption scheme includes an encryption key for decrypting the content (i.e., list of services) provided at the specified location. Using the location information and the encryption scheme, the printing device is able to locate and fetch desired services.

Accordingly, the cloud server 10 has flexibility to manage and relocate services based on load requirements and regional requirements (e.g., locations of various cloud-registered printing devices). Further, service locations may be securely exchanged between the cloud server 102 and printing devices, thereby reducing or eliminating security risks associated with printing devices that are manufactured with service locations embedded thereon. Moreover, new services may be provided to legacy devices by adding the services and the locations to the discovery service and providing such legacy devices with the service locations.

Figure 2:
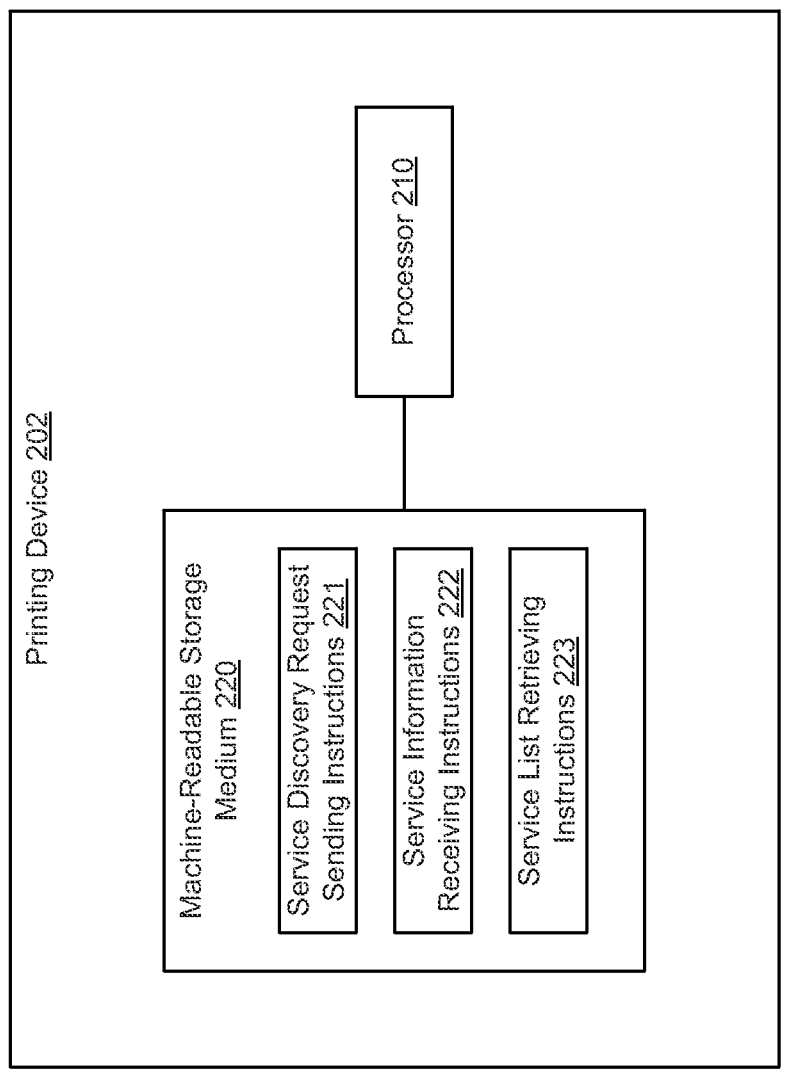
FIG. 2 is a block diagram of a printing device, according to one example.

FIG. 2 is a block diagram of a printing device, according to one example. Printing device 202 is a web-connected printing device. For example, printing device 202 is registered with cloud server 102 (i.e., cloud-registered). Thus, printing device 202 may communicate with cloud server 102 via the Internet. Printing device 202 may include one or more of a multifunction printer (MFP), an all-in-one (AIO), or other web-connected printing devices. In the example of FIG. 2, printing device 202 includes a processor 210 and a machine-readable storage medium 220.

Processor 210 may be one or more central processing units (CPUs), microprocessors, And/or other hardware devices suitable for retrieval and execution of instructions stored in machine-readable storage medium 220. Processor 210 may fetch, decode, and execute instructions 221, 222, and 223 to enable device service discovery, as described below. As an alternative, or in addition to retrieving and executing instructions, processor 210 may include one or more electronic circuits comprising a number of electronic components for performing the functionality of one or more instructions 221, 222, and 223.

Machine-readable storage medium 220 may be an electronic, magnetic, optical, or other physical storage device that stores executable instructions. Thus, machine-readable storage medium 220 may be, for example, Random Access Memory (RAM), an Electrically-Erasable Programmable Read-Only Memory (EEPROM), a storage drive, an optical disc, and the like. As described in detail below, machine-readable storage medium 220 may be encoded with executable instructions for enabling device service discovery.

Service discovery request sending instructions 221 may send a service discovery request to a cloud server (e.g., cloud server 102 of FIG. 1). The request may include profile information of the printing device. In certain examples, the profile information includes device ID/credentials usable by the cloud server to authenticate the printing device. The request may be sent to the cloud server via a secure communication protocol such as an HTTPS. In some examples, the address of the cloud server is known to the printing device 202 (e.g., hard coded in the printing device 202). For example, the address of the cloud server may be preinstalled in an operating system of the printing device 202. Accordingly, the printing device 202 connects to the cloud server to send the discovery request.

In response to the discovery request, service information receiving instructions 222 may receive service information from the cloud server. The service information may include location information and encryption scheme for retrieving a list of services available to the printing device 202. In certain examples, the location information includes a URL for retrieving the list of services available to the printing device, and the encryption scheme includes an encryption key for decrypting the list of services at the URL. In other examples, the location information and the encryption scheme are stored a non-volatile random-access memory (NVRAM) of the printing device 202, thereby reducing the number of requests for service discovery sent by the printing device 202.

Service list retrieving instructions 223 may retrieve the list of services using the location information and the encryption scheme provided by the cloud sever. For example, the printing device 202 may connect to the URL and decrypt the list of services to extract service locations and/or end points. In certain examples, the printing device may connect to the URL via an HTTP communications protocol. In some examples, the URL may be associated with a CDN (e.g., an edge server, a proxy server) to reduce the load on the cloud server.

Figure 3:
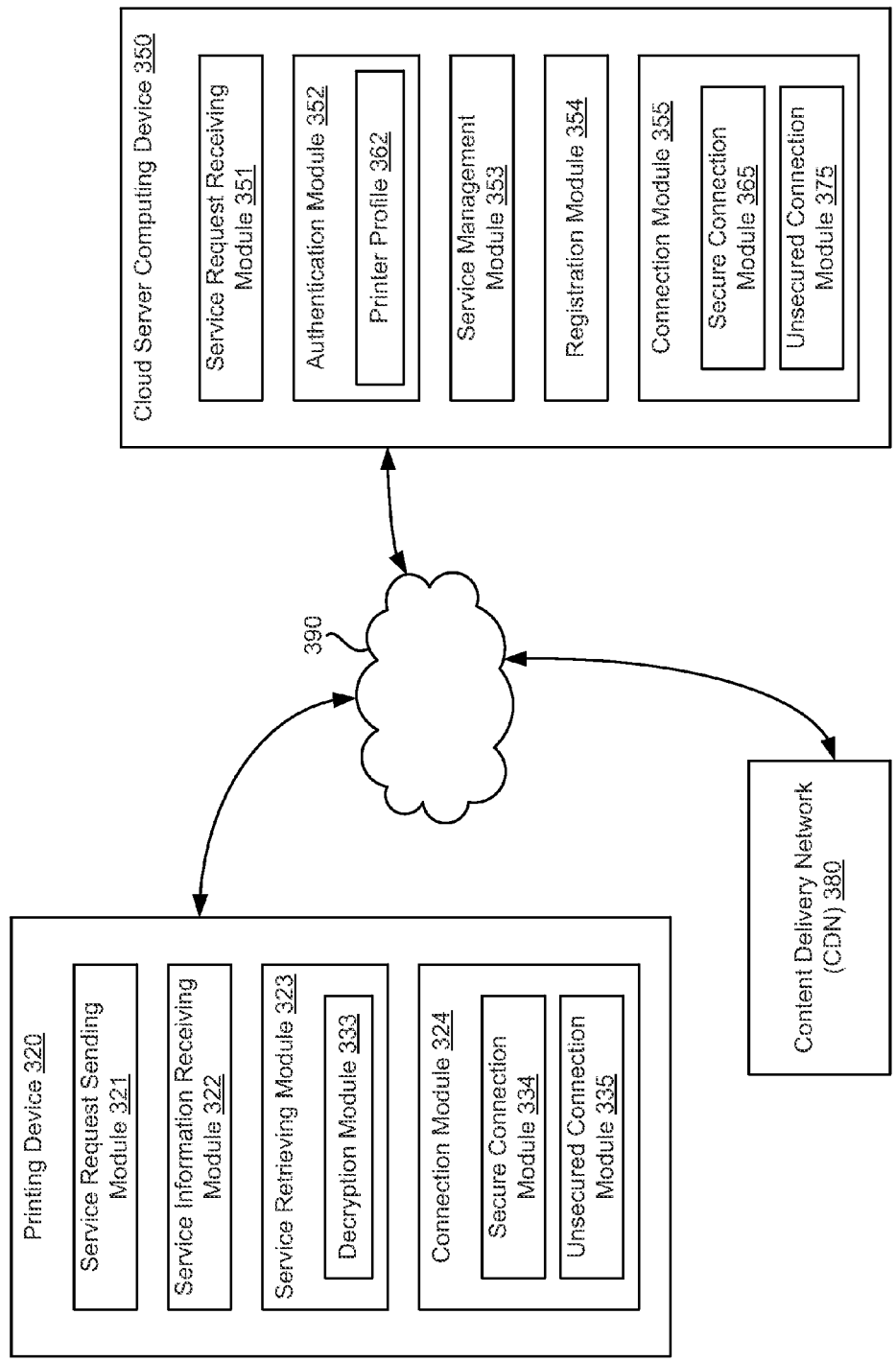
FIG. 3 is a block diagram of a cloud server computing device for providing service discovery to a printing device, according to one example.

FIG. 3 is a block diagram of a cloud server computing device for providing service discovery to a printing device, according to one example. As illustrated in FIG. 3 and described below, cloud server 350 may communicate with printing device 320 and with CDN 380 to provide printing device 320 with service discovery.

As illustrated, printing device 300 may include a number of modules 321-335, while cloud server 350 may include a number of modules 351-375. Each of the modules may include a series of instructions encoded on a machine-readable storage medium and executable by a processor of the respective device 320, 350. In addition or as an alternative, each module may include one or more hardware devices including electronic circuitry for implementing the functionality described below.

As with printing device 202 of FIG. 2, printing device 320 may be a web-connected printing device such as an AIO or an MFP for executing the functionality described below. As detailed below, printing device 320 may include a series of modules 321-335 for receiving service discovery information from cloud server 350.

Service request sending module 321 may send a service discovery request to cloud server 350 via a secure connection (e.g., an HTTPS connection). The service request may include profile information of the printing device 320 such as device ID/credentials usable by the cloud server 350 to authenticate printing device 320. In certain examples, the profile information is usable by the cloud server 350 to identify the configurations of the printing device 320 which may determine appropriate services for the printing device 320.

Service information receiving module 322 may then receive service information from the cloud server 350, responsive to the discovery request. The service information may include location information and encryption scheme for retrieving a list of services available to the printing device 320. For example, the location information may be a URL for retrieving the list of services. In certain examples, the encryption scheme includes an encryption method used by the cloud server 350 to encrypt the content/service information provided at the specified location(s), and an encryption key for decrypting the content. For example, the encryption method may be an advanced encryption standard (AES) with 256 bit key size (i.e., AES256), and the encryption key may be base 64 encoded. In certain examples, printing device 320 may store the URL and the encryption scheme in an NVRAM to reduce the frequency of discovery requests sent to the cloud server 350.

Service retrieving module 323 may retrieve the list of services using the location information and the encryption scheme. For example, printing device 320 may connect to the URL via a non-secure communications protocol (e.g., HTTP) to retrieve the list of services. Further, service retrieving module 323 may include a decryption module 333 to decrypt the content at the URL using the key. In certain examples, the URL may be associated with CDN 380. In such examples, the content may be retrieved from CDN 380 and decrypted. Once the content is decrypted, printing device 320 may connect to the desired services at the specified locations/endpoints.

Printing device 320 may also include connection module 324 for establishing connections with at least one of cloud server 350, CDN 380, and service locations/endpoints over Internet 390. Connection module 324 may include secure connection module 334 and unsecured connection module 335. For example, secure connection module 334 may establish an HTTPS connection with cloud server 350 for sending the discovery request, and may establish a HTTP connection with CDN 380 for retrieving the content/list of services.

As with cloud server 102 of FIG. 1, cloud server 350 of FIG. 3 may be any server accessible to printing device 320 over the Internet 390 that is suitable for executing the functionality described below. As detailed below, server 350 may include a series of modules 351-375 for providing service discovery to printing device 320.

Service request receiving module may receive a service discovery request from printing device 320, where the service discovery request includes profile information for the printing device 320. For example, the profile information may include a device ID associated with the printing device 320.

Authentication module 352 may authenticate printing device 320 based on the profile information. In some examples, authentication module 352 includes stored printer profile 362. For example, the printer profile 362 is stored upon registration of the printing device 202 with the cloud server 350. Accordingly, authentication module 352 may check the profile information supplied by the printing device 320 against the printer profile 362 stored in the cloud server 350. In certain examples, the profile information includes device ID/credentials corresponding to the printing device 320.

Service management module 353 may provide printing device 320 with service information upon successful authentication of printing device 320 by the authentication module 352. In some examples, the service information includes location information and encryption scheme for retrieving a list of services (e.g., content) available to printing device 320. For example, the location information may include a URL corresponding to CDN 380. In certain examples, the encryption scheme includes an encryption method employed by the cloud server 350 to encrypt the content (e.g., AES256) and encryption key for decrypting the content.

Further, server management module 353 may update and/or migrate locations of services available to the printing device 320. For example, new services may be added for the printing device 320. As another example, services for the printing device 320 may be relocated based on a number of factors including a location of the printing device 320 and resources (e.g., bandwidth, load, etc) of the cloud server 350. When services are updated and/or migrated, updated location information may be provided to the printing device 320 in response to the service discovery request.

Registration module 354 may register printing device 320 with the cloud server 350. In some examples, a device ID is associated with the printing device 320 during registration. The device ID may be usable by the printing device 320 to establish a connection with the cloud server 350 and usable by the cloud server 350 for authenticating the printing device 320.

Connection module 355 may establish communication connections between cloud server 350 and at least one of printing device 320 and CDN 380. Connection module may include secure connection module 365 and unsecured connection module 375. For example, secure connection module 365 may establish an HTTPS connection with printing device 320 during registration or during receipt of the service discovery request. As another example, unsecure connection module 375 may establish an HTTP connection with CDN 380 to cache the content (e.g., list of services) to be retrieved by the printing device 320.

Figure 4:
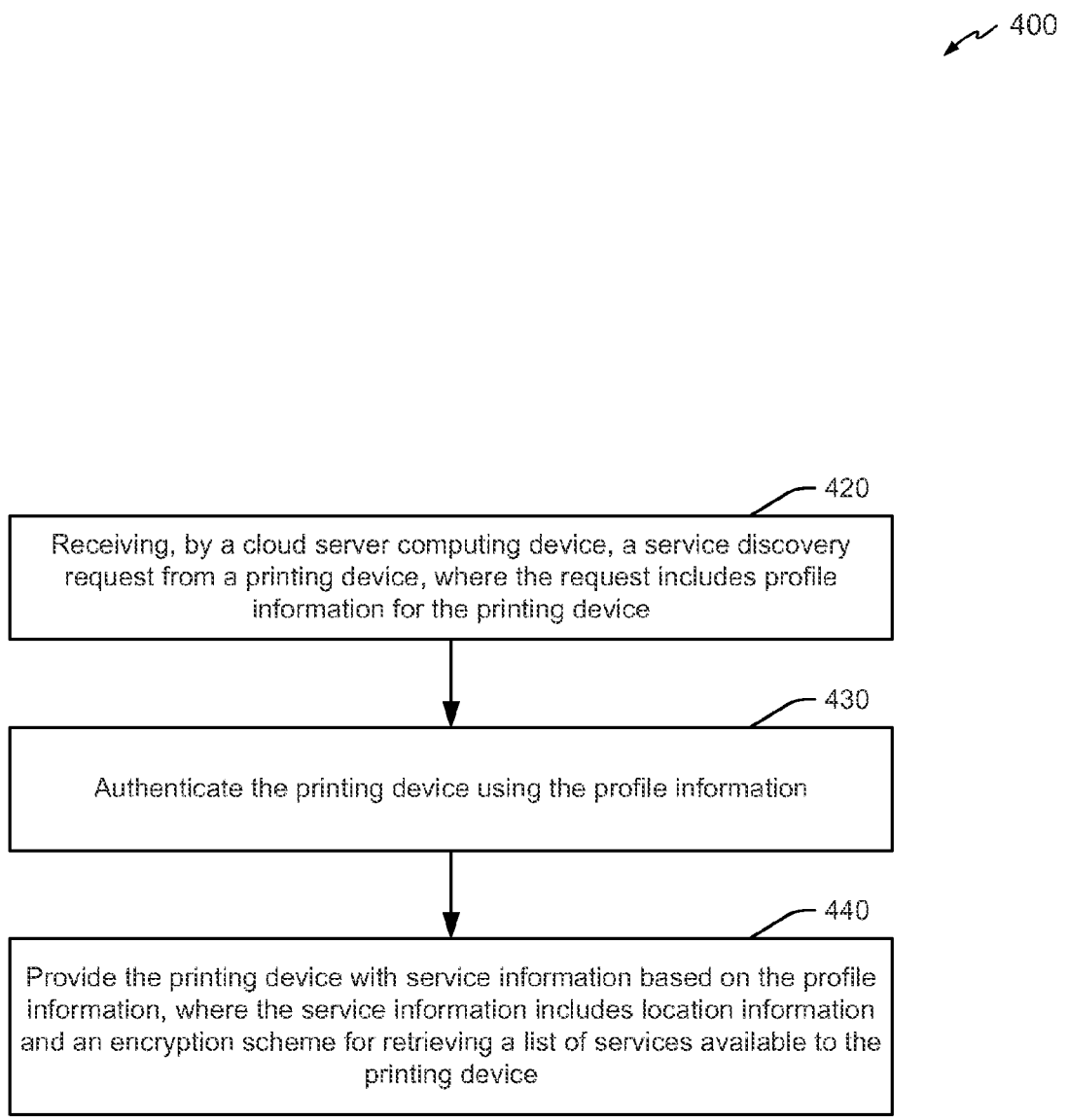
FIG. 4 is a flowchart of a method of enabling device service discovery, according to one example.

FIG. 4 is a flowchart of a method 400 of enabling device service discovery, according to one example. Although execution of method 400 is described below with reference to the components of cloud servers 102 and 350 of FIGS. 1 and 3, respectively, other suitable components for execution of method 400 will be apparent to those of skill in the art. Additionally, the components for executing method 400 may be spread among multiple devices. Method 400 may be implemented in the form of executable instructions stored on a machine-readable storage medium, such as non-transitory machine-readable storage medium 120 of FIG. 1, and/or in the form of electronic circuitry.

Method 400 includes receiving, by a cloud server, a service discovery request from a printing device, at 420. For example, service discovery request receiving instructions 121 or service request receiving module may receive a service discovery request from printing device 202/320. In certain examples, the request includes profile information (e.g., device ID) associated with the printing device.

Method 400 also includes authenticating the printing device using the profile information, at 430. For example, authentication instructions 122 or authentication module 352 may authenticate and verify that printing device 202/320 is cloud-registered.

Method 400 includes providing the printing device with service information based on the profile information, at 440. For example, service management instructions 123 or service management module 353 may provide printing device 202/320 with service information upon successful authentication. In some examples, the service information includes location information and an encryption scheme for retrieving a list of services (e.g., stored as content at CDN 380) available to printing device 202/320.

Figure 5:
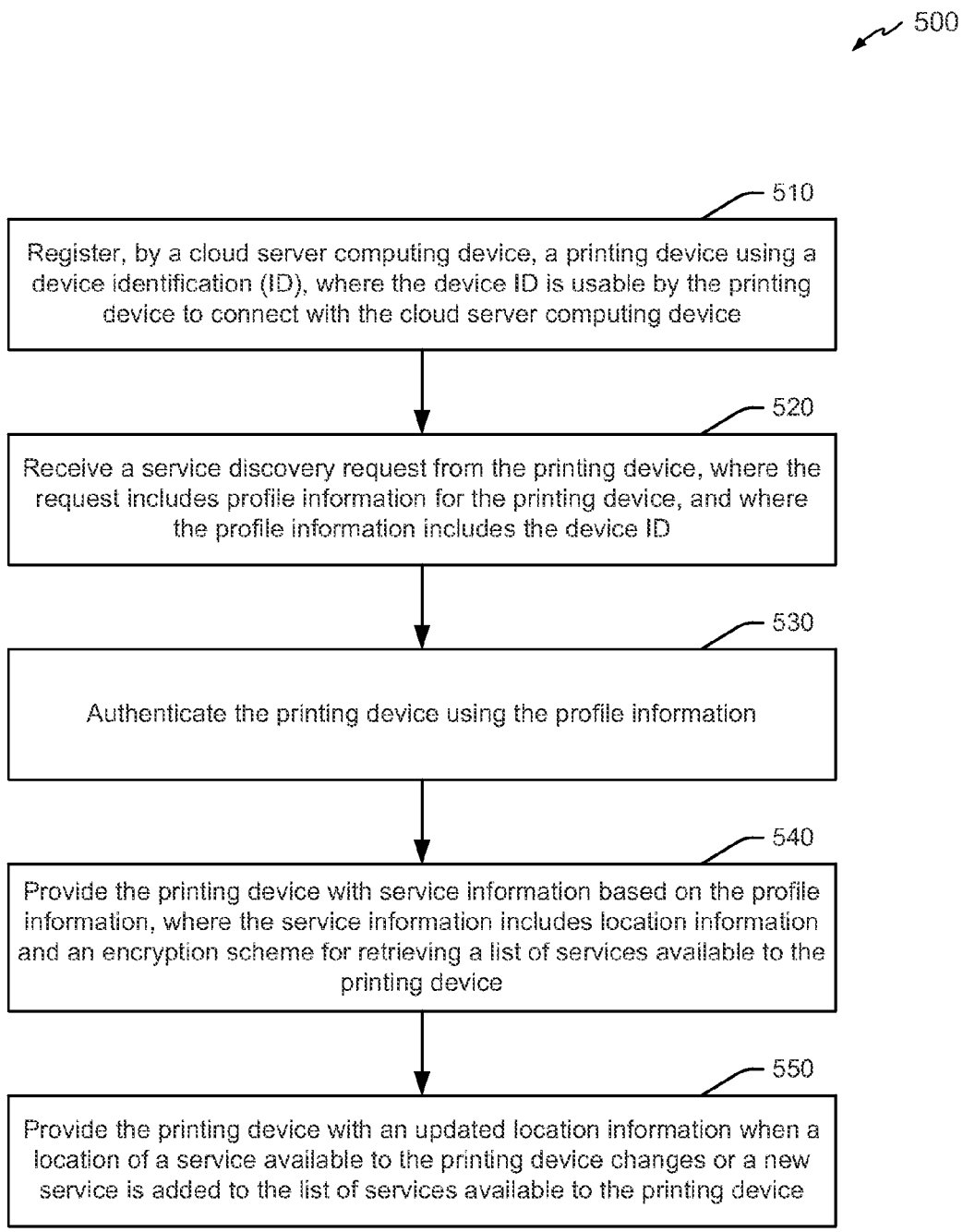
FIG. 5 is a flowchart of a method of enabling device service discovery, according to one example.

FIG. 5 is a flowchart of a method 500 of enabling device service discovery, according to one example. Although execution of method 500 is described below with reference to the components of cloud servers 102 and 350 of FIGS. 1 and 3, respectively, other suitable components for execution of method 500 will be apparent to those of skill in the art. Additionally, the components for executing method 500 may be spread among multiple devices. Method 500 may be implemented in the form of executable instructions stored on a machine-readable storage medium, such as non-transitory machine-readable storage medium 120 of FIG. 1, and/or in the form of electronic circuitry.

Method 500 includes registering, by a cloud server, a printing device using a device ID, at 510. For example, registration module 354 may register printing device 202/320 with cloud server 102/350 using a device ID. The device ID may be usable by the printing device 202/320 to connect to the cloud server 102/350. Moreover, in certain examples, the printing device is authenticated based at least in part on the device ID.

Method 500 includes receiving a service discovery request from the printing device, at 520. For example, service discovery request receiving instructions 121 or service request receiving module 351 may receive a service discovery request from printing device 202/320, where the request includes profile information (e.g., device ID) for the printing device 202/320.

Method 500 further includes authenticating the printing device using the profile information, at 530. For example, authenticating instructions 122 or authentication module 352 may authenticate the printing device 202/320 based at least in part on the profile information (e.g., device ID).

Method 500 includes providing the printing device with service information based on the profile information, at 540. For example, service management instructions 123 or service management module 353 may provide the printing device 202/320 with service information. In certain examples, service information includes location information an encryption scheme for retrieving the list of services available to the printing device 202/320.

Method 500 includes providing the printing device with updated location information when a location of a service available to the printing device changes or when a new service is added to the list of services available to the printing device, at 550. For example, service management instructions 123 or service management module 353 may migrate and/or update services available to the printing device 202/320. When a last known service location available to the printing device 202/320 has changed or when new services are added, the printing device 202/320 may be provided with the updated location information.

In the foregoing description, numerous details are set forth to provide an understanding of the present disclosure. However, it will be understood by those skilled in the art that the present disclosure may be practiced without these details. While the disclosure has been described with respect to a limited number of examples, those skilled in the art will appreciate numerous modifications and variations therefrom. It is intended that the appended claims cover such modifications and variations as fall within the true spirit and scope of the disclosure.

What is claimed is:

1. A cloud server computing device for enabling device service discovery, comprising:
   a processor to:
   receive, from a printing device, a service discovery request comprising profile information associated with the printing device;
   authenticate the printing device based on a check of the profile information supplied by the printing device against a printer profile; and
   provide, based on the authentication and the profile information, the printing device with location information indicating a location from which to retrieve a list of services comprising service locations of services available to the printing device,
   wherein the location information comprises a uniform resource locator (URL) for retrieving the list of services, wherein an address of the URL represents the location where the list of services is located, the address where the list of services is located is distinct from a cloud server address of the cloud server computing device, and
   provide an encryption key usable to decrypt the list retrievable from the address of the URL where the list of services is located;
   the processor further to:
   identify a load requirement and a regional requirement;
   migrate at least one of the services through a change regarding a location of at least one of the services based on a location of the printing device and load of the cloud server computing device; and
   update the location information with the changed location of at least one of the services.

2. The cloud server computing device of claim 1, the processor further to:
   register the printing device with the cloud server computing device using a device identification,
   wherein the device identification is usable by the printing device to connect to the cloud server computing device, and
   wherein the printing device is authenticated based at least in part on the device identification.

3. The cloud server computing device of claim 1, the processor further to:
   determine whether the location of at least one of the services available to the printing device last known to the printing device has changed, responsive to receipt of the service discovery request; and
   provide the printing device with updated location information.

4. The cloud server computing device of claim 1, the processor further to:
   identify a configuration of the printing device based on the profile information;
   in response to a determination of appropriate services based on the configuration, add new services to the list of services available to the printing device; and
   provide the printing device with updated location information comprising an updated location to the updated list comprising service locations of the new services.

5. The cloud server computing device of claim 1, wherein the service discovery request is received via a secure communication protocol and the list is retrievable via a non-secure communication protocol.

6. The cloud server computing device of claim 5, wherein the secure communication protocol comprises a hypertext transfer protocol secure (HTTPS) and the non-secure communication protocol comprises a hypertext transfer protocol (HTTP).

7. The cloud server computing device of claim 1, wherein the list is provided to the printing device via a content delivery network (CDN).

8. The cloud server computing device of claim 1, wherein the list of services comprises at least one of an email printing service, a printing application, a scan service, a fax service, a copy service, and a device management service.

9. A method for enabling device service discovery, comprising:

receiving, by a cloud server computing device, a service discovery request from a printing device, wherein the request comprises profile information of the printing device;

authenticating the printing device against a printer profile of the cloud server computing device using the profile information;

identifying a configuration of the printing device based on the profile information;

determining that a service is available to the printing device dependent on capabilities of the printing device and availability of the service; and providing the printing device with a uniform resource locator (URL) associated with a list address to a location of a list of services available to the printing device and an encryption key usable to decrypt the list retrievable from the list address, the list address distinct from a cloud server address of the cloud server computing device, and migrating at least one of the services by changing a location of the service available to the printing device based on a regional requirement and a load requirement;

adding a new service to the list of services available to the printing device; and providing the printing device with updated location information, responsive to receipt of the service discovery request, wherein the updated location information comprises a second URL associated with an updated list address to a location of a second list of services that includes at least one of the changed location and the new service.

10. The method of claim 9, further comprising:

registering the printing device using a device identification, wherein the device identification is usable by the printing device to connect to the cloud server computing device; and authenticating the printing device based at least in part on the device identification.

11. A non-transitory computer-readable medium comprising instructions that, when executed by a processor of a printing device, cause the printing device to:

send a service discovery request to a cloud server computing device at a first address, wherein the request comprises profile information of the printing device;

receive location information indicating a second address from which to retrieve encrypted content and an encryption key usable to decrypt the encrypted content;

retrieve the encrypted content at the second address; and decrypt the encrypted content using the encryption key, the encrypted content comprising a list of service locations of services available to the printing device, the processor further to receive updated location information including a changed location of at least one of the services available to the printing device after migration of at least one of the services available to the printing device occurs when location of at least one of the services available to the printing device changes based on a regional requirement and a load requirement.

12. The non-transitory computer-readable medium of claim 11, wherein the location information comprises a uniform resource locator (URL), the processor further to: store the URL and the encryption key in a non-volatile random-access memory of the printing device; connect to the URL via a hypertext transfer protocol (HTTP), wherein a list of services is encrypted at the URL; and obtain a particular service location of a particular service from the decrypted list of service locations.

13. The non-transitory computer-readable medium of claim 12, the processor further to connect to the particular service at the particular service location based on a region of the printing device, wherein the particular service location of the particular service is different from a first address of the cloud server computing device and different from the second address of the encrypted contents.

14. The non-transitory computer-readable medium of claim 13, wherein the URL is associated with a content delivery network (CDN), the processor further to retrieve the encrypted content from the CDN.

15. The non-transitory computer-readable medium of claim 14, the processor further to:

connect to the cloud server computing device using hypertext transfer protocol secure (HTTPS);

send the service discovery request to the cloud server computing device over the HTTPS connection; and connect to the CDN via the second address using a hypertext transfer protocol (HTTP) to locate the list of services cached on the CDN.

16. The non-transitory computer-readable medium of claim 11, the processor further to send the service discovery request to a predetermined address of the cloud server computing device, wherein the predetermined address is the first address preinstalled in an operating system of the printing device.

* * * * *